United States Patent
Kossira et al.

(10) Patent No.: US 8,886,400 B2
(45) Date of Patent: Nov. 11, 2014

(54) METHOD FOR DETERMINING THE DRAWBAR LENGTH OF A TRAILER OF A TRACTOR VEHICLE

(75) Inventors: Christoph Kossira, Ingolstadt (DE);
Andreas Baudisch, Alteglofsheim (DE);
Anton Obermüller, Königsdorf (DE);
Ulrich Voll, München (DE)

(73) Assignee: Audi Aktiengesellschaft, Ingolstadt (DE)

( * ) Notice: Subject to any disclaimer, the term of this patent is extended or adjusted under 35 U.S.C. 154(b) by 0 days.

(21) Appl. No.: 13/883,690

(22) PCT Filed: Oct. 31, 2011

(86) PCT No.: PCT/EP2011/005487
§ 371 (c)(1),
(2), (4) Date: Jul. 22, 2013

(87) PCT Pub. No.: WO2012/059207
PCT Pub. Date: May 10, 2012

(65) Prior Publication Data
US 2014/0136052 A1 May 15, 2014

(30) Foreign Application Priority Data
Nov. 4, 2010 (DE) .......... 10 2010 050 474

(51) Int. Cl.
*G06F 7/00* (2006.01)
*B60D 1/24* (2006.01)
*B60D 1/06* (2006.01)
*B60D 1/58* (2006.01)
*B62D 13/06* (2006.01)

(52) U.S. Cl.
CPC ........... *B62D 13/06* (2013.01); *B60D 1/245* (2013.01); *B60D 1/06* (2013.01); *B60D 1/58* (2013.01)
USPC .......................................... 701/36

(58) Field of Classification Search
USPC .............................. 701/36, 41, 42, 43, 44, 46
See application file for complete search history.

(56) References Cited

U.S. PATENT DOCUMENTS

| 6,292,094 B1 | 9/2001 | Deng et al. |
| 7,904,222 B2 | 3/2011 | Lee et al. |

(Continued)

FOREIGN PATENT DOCUMENTS

| DE | 102004050149 | 4/2006 |
| DE | 102005042957 | 3/2007 |

(Continued)

OTHER PUBLICATIONS

International Search Report issued by the European Patent Office in International Application PCT/EP2011/005487 on Jan. 10, 2012.

*Primary Examiner* — Kim T Nguyen
(74) *Attorney, Agent, or Firm* — Henry M. Feiereisen LLC

(57) ABSTRACT

In a method for determining the drawbar length of a trailer of a tractor vehicle with a front-axle steering system for adjusting a front-axle steering angle and optionally additionally a rear-axle steering system for setting a rear-axle steering angle, an estimated value for the drawbar length is determined with an estimation method from an articulation angle, as detected by a sensor, between the trailer and the tractor vehicle on the basis of the front-axle steering angle and optionally the rear-axle steering angle, and the movement variables speed and yaw rate of the tractor vehicle.

17 Claims, 2 Drawing Sheets

(56) References Cited

U.S. PATENT DOCUMENTS

| | | |
|---|---|---|
| 2004/0130441 A1 | 7/2004 | Lee et al. |
| 2005/0055138 A1* | 3/2005 | Lee et al. ............... 701/1 |
| 2009/0005932 A1* | 1/2009 | Lee et al. ............... 701/41 |
| 2012/0049469 A1 | 3/2012 | Michel et al. |
| 2012/0098221 A1 | 4/2012 | Michel et al. |

FOREIGN PATENT DOCUMENTS

| | | |
|---|---|---|
| DE | 102007025969 | 12/2008 |
| DE | 102008029612 | 1/2009 |
| DE | 102009007990 | 8/2010 |

\* cited by examiner

METHOD FOR DETERMINING THE DRAWBAR LENGTH OF A TRAILER OF A TRACTOR VEHICLE

CROSS-REFERENCES TO RELATED APPLICATIONS

This application is the U.S. National Stage of International Application No. PCT/EP2011/005487, filed Oct. 31, 2011, which designated the United States and has been published as International Publication No. WO 2012/059207 and which claims the priority of German Patent Application, Serial No. 10 2010 050 474.2, filed Nov. 4, 2010, pursuant to 35 U.S.C. 119(a)-(d).

BACKGROUND OF THE INVENTION

The invention relates to a method for determining the drawbar length of a trailer of a tractor vehicle according to preamble the claim 1 and the use of this method to determine a maximum permissible articulation angle between the tractor vehicle and its trailer.

Maneuvering a vehicle combination, as for example a passenger car or a truck with trailer, in particular a single-axle trailer according to the German Highway Code, requires a high skill level from a driver of such vehicle. The articulation angle between the longitudinal axis the tractor vehicle and a trailer drawbar attached by a drawbar represents an additional degree of freedom which may cause instabilities during reverse travel which must be compensated by the driver via appropriate steering angle corrections. When a maximum articulation angle is exceeded, there is a risk that the trailer jackknifes unless the brake is applied early enough or forward travel is commenced. An articulation angle beyond the maximum articulation angle can be reduced only by driving forward in a straight line.

The kinematic and dynamic behavior of a trailer during maneuvering, in particular jackknifing during reverse maneuvers, depends on the distance between the ball head of the trailer coupling and the hitch the drawbar, respectively, and the axle of the trailer. An effective drawbar length can be defined for multi-axle trailers, for example, the distance of a point between the hitch and a point located between the two axles of the trailer.

For example, the maximum allowable articulation angle, at which the trailer can still be straightening in reverse is about 25° for a short trailer with a drawbar length from 1.5 m, whereas for a long trailer with a drawbar length from 4.9 m this value increases to about 85°. These exemplary values apply to a wheelbase of about 3 m and a distance from ball head to the rear-axle of the trailer of about 1 m when only the front-axle of the tractor vehicle is steered.

It would therefore be possible to have a maneuvering assistant of the tractor vehicle use the full maneuvering space of the tractor-trailer combination by determining the maximum permissible articulation angle for vehicles with and without rear-axle steering. If such drawbar length not known, the maneuvering assistant would start with a maximum permissible articulation angle obtained from the shortest possible drawbar length of a permitted trailer.

In order to fully use the maneuvering space of a tractor-trailer combination for the actually attached trailer, its drawbar length must be known.

SUMMARY OF THE INVENTION

U.S. 2004/0130441 A1 discloses a control system for estimating the drawbar length of a trailer of a tractor vehicle with rear-axle steering, wherein an estimated value for the articulation angle is determined with an algorithm based on an estimated drawbar length, the steering angle of the front wheels and the rear wheels, a measured articulation angle, the speed of the tractor vehicle and its yaw rate. The estimated articulation angle is compared with the measured articulation angle to generate from the difference an articulation angle error which is converted to a drawbar length error. This drawbar length error is compared with the drawbar length estimate to correct the drawbar length estimate. The corrected drawbar length estimate should match the actual value of the drawbar length after several computation loops.

The estimation method described in U.S. 2004/0130441 A1 is characterized in that during a computation period a current articulation angle estimate is determined from the movement variables the tractor vehicle and the trailer, namely speed of the tractor vehicle, the steering angle on the front axle and rear-axle, the yaw rate and the measured articulation angle and the articulation angle estimate from the last computation period, which is compared with the current measured articulation angle, producing an articulation angle error signal based on the difference. This articulation angle error signal is supplied to a PID controller which generates therefrom a drawbar angle error signal which is used to correct the drawbar angle estimate determined in the previous computation period. The corrected drawbar angle estimate is outputted as a current drawbar angle estimate for the next computation period.

The estimation method is terminated, when the articulation angle error during a specific time period lies within a given value range. In this case, the current drawbar angle estimate is accepted as the current value of the drawbar length.

It has been observed with this known estimation method of the drawbar length, that its application is limited onto a few driving situations of a tractor vehicle and trailer and is hence hardly practical. In particular, an exact estimate can only be attained with short forward or reverse driving maneuvers; furthermore, steering maneuvers causing curvy or sinusoidal driving maneuvers can also result in an exact estimate of the drawbar length.

Furthermore, U.S. 2005/0055138 A1 discloses an estimation method based on a similar estimation principle system for estimating a drawbar length, wherein additionally a yaw rate of the trailer is estimated from a drawbar length determined in a previous computation cycle, and the measured quantities steering angle of the front-axle and rear-axle of a tractor vehicle and its speed and yaw rate, which is compared with a yaw rate measured by a sensor of the trailer. The difference between these two qualities is then supplied as a yaw rate error signal to a PID which generates therefrom a drawbar angle error signal used to correct the drawbar angle estimate determined in the previous computation period. The corrected drawbar angle estimate is outputted as a current drawbar angle estimate for the next computation period.

Disadvantageously, this known estimation method disclosed in U.S. 2005/0055138 A1 requires a yaw rate sensor for the trailer. This known method is also of little practical value because exact estimates for the drawbar length can only be attained when specific maneuvers such as brief forward and backward movements or curvy or sinusoidal driving maneuvers are performed.

To determine the maximum permissible articulation angle of a tractor-trailer combination, methods are also known which start from a known drawbar length, as described, for example, in DE 2007 025 969 A1. However, such method disadvantageously requires that the current parameters must be entered into an assistant.

It is therefore an object of the invention to provide a method for determining the drawbar length of a trailer of a tractor-trailer combination of the aforedescribed type with which a high accuracy the estimate for the drawbar length can be obtained, in particular without the need to perform specific driving maneuvers.

This object is solved with a method having the features of claim 1.

This method according to the invention is characterized in that the estimation method is configured to produce three sequences of drawbar length estimates for the drawbar length, wherein the first sequence is formed from a sequence of estimation time windows wherein the end of an estimation time window is defined by the existence of predetermined conditions relating to dynamic movement variables of the tractor vehicle and the trailer. The second consecutive sequence is determined by statistical evaluation from the so-far determined drawbar length estimates of the estimation time window as statistical drawbar length estimates, each being assigned a quality measure. In particular, a smoothed sequence of estimates is generated, thus eliminating statistical outliers. The so determined statistical drawbar length estimates with their respective quality measures are used to generate the third sequence, the final estimates for the drawbar length.

The sequences are thus generated continuously, i.e. "on the fly", from the respective previous sequences up to the respective current time step and or computation step and continue in principle unlimited, unless this process is terminated.

This final sequence of drawbar length estimates converge with high probability to around a value, which approaches the true value the drawbar length from below.

This ensures that an accurate estimate of the drawbar length which is safer for the maneuvering is determined with high probability. Advantageously, the drawbar length estimate weighted with the quality measure produces a value for the drawbar length which ensures with high probability that the value assumed in the computation of the maximum permissible articulation angle is not too high compared with the actual drawbar length. It is thus possible to assume a worst-case value for the drawbar length in the computation of the maximum permissible articulation angle when a predetermined value of the quality measure is not attained.

In a particularly advantageous embodiment of the invention, the drawbar length estimates are generated by using articulation angle estimates for the articulation angle and offset estimates for the offset between the articulation angle estimate and the articulation angle measured by the sensors, wherein the articulation angle estimates for the articulation angle and the offset estimates for the offset between the articulation angle estimate and the articulation angle measured by the sensors are determined with the estimation method.

Advantageously, the offset value inherent in the measurement of the articulation angle is thus estimated, which may also change over time, so as to further improve the estimate for the drawbar length, i.e., two unknown parameters are determined simultaneously with the estimation method according to the invention, namely the drawbar length and the offset the measured articulation angle.

According to an embodiment of the invention, for the statistical evaluation of the drawbar length estimates, an undirected graph node is formed for nodes from the existing drawbar length estimates incrementally and continuously, i.e. "on the fly", wherein the previous drawbar length estimates correspond to the nodes and an edge is drawn depending on the value of a distance measure between the drawbar length estimates as a node. Advantageously, this can be used to identify so-called "outliers".

In a further development of the invention, the statistical drawbar length estimate is determined from the nodes with maximum degree and the quality measure is determined as a function of the already generated graphs. The quality measure will typically depend only from the structure of the degrees of the nodes in the graphs, preferably therefore from maximum degree the graph. Alternatively, the drawbar length estimate can also be determined as a minimum of the estimated values corresponding to the notes with a maximum degree or as a maximum of the estimated values corresponding to the nodes with maximum degree.

According to another improvement, the drawbar length estimate may be estimated from the set of estimated values that correspond to the nodes, which are part of a maximum clique of the graphs, wherein the quality measure is again determined as a function of the maximum degree.

According to another development of the invention, the beginning and the end of each estimation time window may be derived from at least the movement variables representing the rotation rate the tractor, the speed of the tractor vehicle and the rotation rate of the trailer in relation to the tractor; preferably, threshold values for the movement variables are determined and the estimation time window is opened and closed as a function of these threshold values. Optionally, the transverse acceleration of the tractor vehicle may be used.

According to other advantageous embodiments of the invention, conditions may be formulated for improving the estimation result, in which case the estimates are discarded. For example, the estimates generated during an estimation time window are discarded when the duration of the estimation time window is less than a predetermined duration threshold value. Preferably, according to another condition, the generated estimates should be discarded when the angle of the trailer swept during the opening phase of the respective window compared to the tractor vehicle is less than a given swing threshold value or when the swing in the value of the articulation angle of the trailer above ground is smaller than a predetermined trailer swing threshold value.

In an advantageous embodiment of the invention, the estimates, in particular the drawbar length estimates as well as the estimates for the articulation angle and the estimates for its offset values, may be determined with a Kalman filter.

In another particularly advantageous embodiment of the invention, the threshold values determining the estimation time window may not only be determined as a function of specific driving situations, but also as a function of the final drawbar length estimate or the determined drawbar length.

Furthermore, according to an advantageous embodiment of the invention, the estimates determined based on the last open estimation time window may be used as starting value for the estimation method, and otherwise standard values (default values) and/or worst-case values.

The method according to the present invention can also be used for tractors with rear-axle steering, wherein the rear-axle steering of the tractor vehicle is also used for determining a drawbar length estimate, in addition to the articulation angle measured with sensors, the front-axle steering angle, the speed and yaw rate of the tractor.

Lastly, the method according to the invention can be used for determining the drawbar length of a trailer of a tractor vehicle for determining the maximum permissible articulation angle between a tractor vehicle and its trailer, for example, by providing a maneuvering assistant with the value of the drawbar length determined with the method of the invention.

The invention will now be described in more detail below with reference to an exemplary embodiment in conjunction with the appended figures, wherein:

DETAILED DESCRIPTION OF PREFERRED EMBODIMENTS

Figure 1:
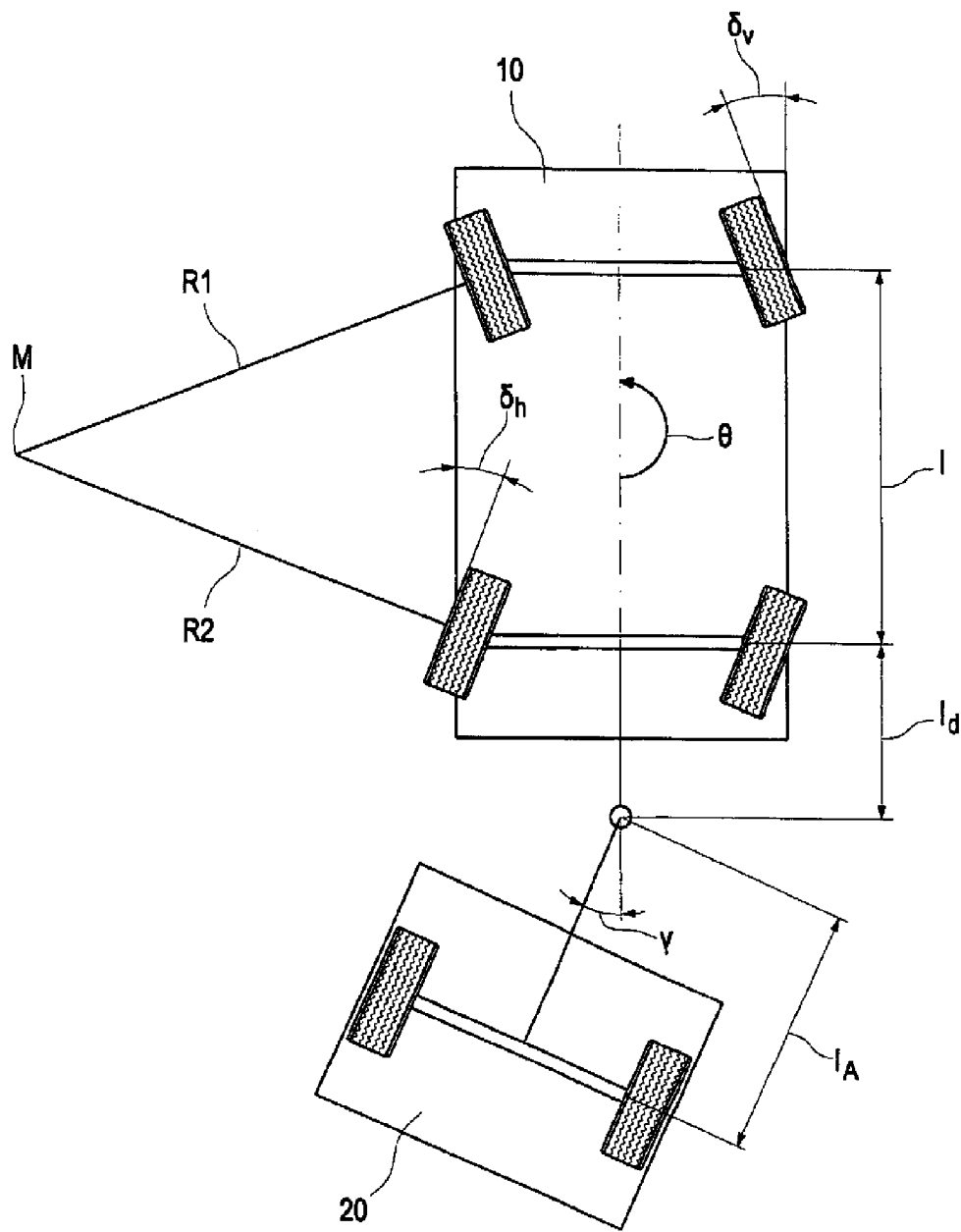
FIG. 1 shows a schematic plan view onto a tractor vehicle and a trailer with the geometric and kinematic parameters of the tractor-trailer combination.

As shown in FIG. 1, a tractor-trailer combination is composed of a tractor vehicle 10 and a trailer 20, wherein additionally geometric as well as kinematic quantities relevant for the method to be described below are shown.

The tractor vehicle has both a front-axle steering system and a rear-axle steering system, wherein a steering angle to the front-axle is designated with $d_v$ and a steering angle on the rear-axle is designated with $d_h$, l designates the distance between the two axles, $l_d$ the distance between the rear-axle and the ball head of the trailer hitch, $l_A$ the drawbar length the trailer 20, $\gamma$ the articulation angle, i.e. the angle between the longitudinal axis of the tractor vehicle 10 and the longitudinal axis the trailer 20 and T the yaw rate the tractor vehicle 10.

At low speed, at which the tractor-trailer combination is typically maneuvered, the movement of the tractor-trailer combination can be described essentially by a kinematic model without taking into account the skew angle, so that the accuracy of these elementary geometrical calculations is adequate for describing the dynamics the tractor-trailer combination during maneuvering, for example for a maneuvering assistant. To estimate parameters of this dynamic system composed of the tractor vehicle 10 and the trailer 20, a non-linear variant of a Kalman filter is used, wherein the parameters to be estimated are the articulation angle $\gamma$ and the offset $\Delta$ between the measured articulation angle $y_{meas}$ and the actual articulation angle $\gamma$.

The state of the system at a specific time t is described with a state vector $x_k = (\gamma, \Delta, l_A)$ by the state transition function:

$$x_k = f(x_{k-1}, u_{k-1}, v_{k-1})$$

$v_k$ is here an optionally multidimensional stochastic error term, which is typically assumed to be independent and have a normal distribution, $u_k$ are external parameters, for example steering angle or speed in the present case.

Furthermore, the system has an observable feature, namely the measured articulation angle $y_{meas}$. The observation function is hence described by the measurement equation:

$$z_k = h(\gamma_k, \Delta_k) + w_k$$

with the observation vector $z_k = \gamma_k$, wherein the observation can be regarded in good approximation as additively disturbed by a zero-mean noise process $w_k$ with the error covariance matrix R with $w_k \sim N(0, R_{11})$. The parameters of the Kalman filter are the initial covariance matrix of the state vector, the initial state, a three-dimensional diagonal matrix $Q_h$ descriptive of the variance of the process noise $v_k$ and the scalar $R_{11}$ describing the variance the measurement noise.

The state transition function f is formulated for the parameters of the state vector in each case as discretized differential equation:

$$\gamma_k = f_\gamma(\gamma_{k-1}, v_v + v_2, \delta_v + v_2, \delta_k + v_2, l, l_d, l_{A,k-1}, \theta) \quad \text{(DGL1)}$$

$$\Delta_k = f_\Delta(\Delta_{k-1}, v_1) \quad \text{(DGL2)}$$

$$l_{A,k} = f_{l_A}(l_{A,k-1}, v_3), \quad \text{(DGL3)}$$

$\gamma$ is here the articulation angle, $v_v$ the speed the tractor, $d_v$ and $d_h$ the steering angle on the front and the rear-axle of the tractor, respectively, l the wheelbase of the tractor, $l_d$ the distance between the rear-axle of the tractor vehicle and the ball head of the trailer hitch, $l_A$ is the drawbar length the trailer, T the yaw rate the tractor, $\Delta$ the offset between the measured articulation angle $y_{meas}$ and the actual articulation angle $\gamma$, and $\Gamma_1$, $\Gamma_2$ and $\Gamma_3$ are each an error term of the noise process $v_k$, wherein the yaw rate T as well as the other movement variables are measured with sensors or can be calculated from the kinematics.

The input variables for this filtering process are hence the variables speed $v_v$ of the tractor, steering angles $d_v$ and $d_h$ on the front-axle and the rear-axle of the tractor vehicle and the yaw rate T the tractor, wherein the wheelbase l and the overhang $l_d$ are constant parameters of the estimation process describing the geometry of the tractor.

The input variables are then supplied to the estimation process only when driving situations exist which provide suitable values of these input parameters for the estimation process. For this purpose, estimation time windows are generated which have a beginning and an end defined in each case by calibratable thresholds. The input variables are measured during such estimation time window and supplied to the aforementioned Kalman filter process in order to generate internal estimated values $\hat{\gamma}$, $\hat{\Delta}$ and $\hat{l}_A$ for the articulation angle $\gamma$, the offset $\Delta$ and the drawbar length $l_A$ with the dynamically following quantifications of the accuracy of the respected estimated values.

A drawbar length estimate $l_A$ is determined with the time-discretized differential equations DGL1, DGL2 and DGL3 during an estimation time window, generating a first sequence of estimates $\hat{l}$, from which a second sequence of statistical drawbar length estimates ($\hat{l}_{A,stat}$) is determined, resulting finally in a third sequence of final estimates $l_{A,\,final}$ of the drawbar length $l_A$, as will be explained below.

The estimation time window is started, for example, when the trailer rotates sufficiently quickly relatively to the tractor vehicle and the lateral acceleration and the tractor vehicle speed are sufficiently small. The estimation time window remains open, for example, as long as the trailer rotates. The window is closed, for example, i.e. the estimation process is terminated, when for example the lateral acceleration is too large or when tractor vehicle speed is too large or too small, but also for example when a cruise control system such as ESP or ABS intervenes. An estimation time window may also be closed when the measured articulation angle signal is inconsistent.

The estimation method according to invention will now be explained based the flowchart according to FIG. 2. With this estimation method, the three different sequences of drawbar length estimates the drawbar length $l_A$ are continuously generated commensurate with the time steps and computation steps, i.e. "on-the-fly", from the estimates produced generated up to the current time step.

Figure 2:
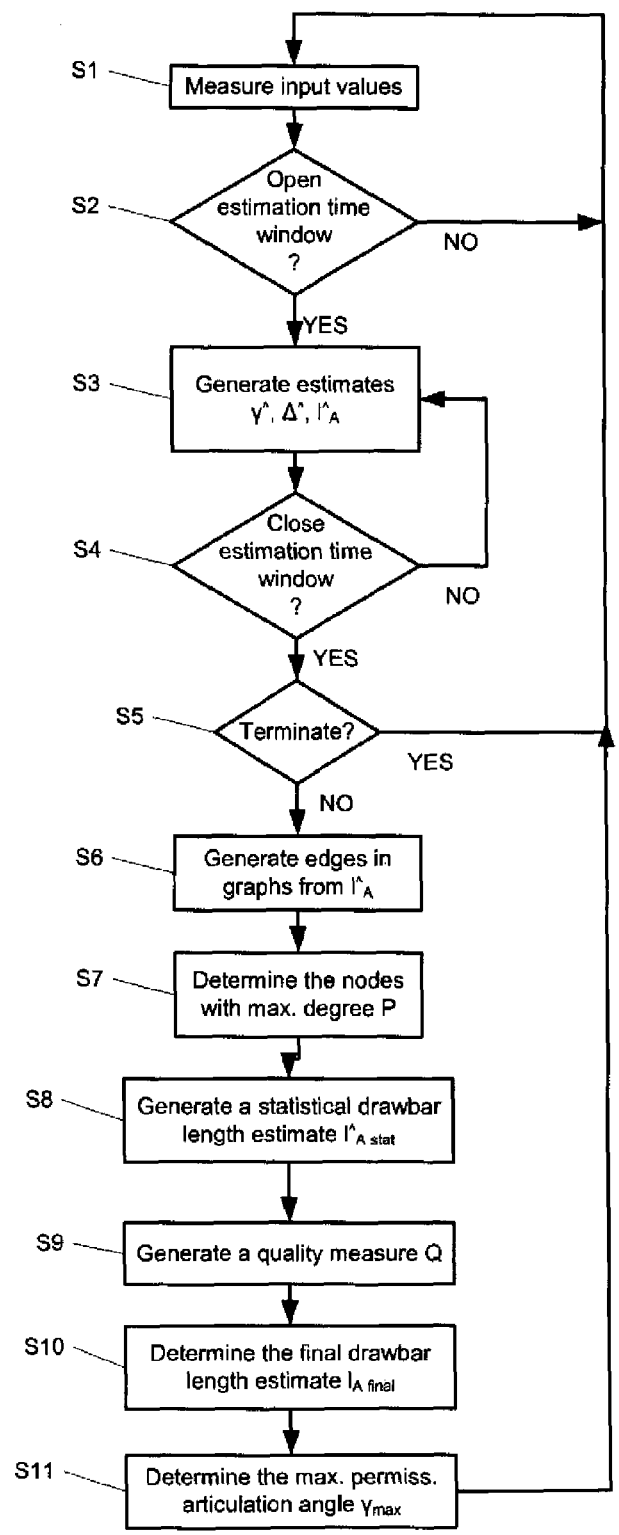
FIG. 2 shows a flowchart explaining the method according to the present invention.

According to FIG. 2, in a first step S1 the input variables are measured, and in a second step S2 it is checked, whether their values are located in the value range defined by the associated threshold values. If this not the case, the process returns to step S1 or, if applicable, an estimation time window is opened.

In the next step S3, the estimated values $\hat{\gamma}$ for the articulation angle, $\hat{\Delta}$ for the offset and $\hat{l}_A$ for the drawbar length are generated based on the aforedescribed filtering process with a Kalman filter. In a subsequent step S4 it is checked, whether the estimation time window needs to be closed if the values of the input variables are no longer located in the range is defined by the corresponding threshold values. If the Input variables meet the threshold conditions, then the window is not closed and the process returns to step S3 for performing the next estimation step.

If the input variables no longer meet the threshold conditions, then the estimation time window is closed and the usability of the drawbar length estimate $\hat{l}_A$ is checked in a subsequent step S5 based a list from criteria which will be explained below; the estimate is discarded if the threshold conditions are met.

Such estimates are, for example, discarded when the duration of the estimation time window was too short or when the integrated change during the duration the open estimation time window of the measured articulation angle γ, i.e. the swing of the articulation angle, was too small. For this purpose, for example, a duration threshold value and/or a swing threshold value is defined. When these threshold conditions are satisfied, the process returns to the input step S1. In addition, similarly the rotation rate of the trailer during the duration of the estimation time window may be used for determining the swing of the trailer above ground.

If the conditions for the validity of the just finished and checked window are satisfied, according to FIG. 2, a graph is incrementally built up in the subsequent steps S6 to S9 for determining a statistical drawbar length estimate $\hat{l}_{A,stat}$ of the drawbar length $l_A$. The set of nodes of the graphs is expanded each time by a corresponding node which corresponds to the just validated drawbar length estimate $\hat{l}_A$ from step S5. Accordingly, in step S6, edges between two nodes are first drawn based on a distance measure, for example, when the values of the nodes are sufficiently similarly, i.e. they differ for example by no more than x %, wherein x is specified by a threshold value selected, for example, between 0.1% and 50%. In this way, a neighborhood for each node is defined mathematically.

In the next step S7, a degree is determined for each node, i.e. the number of edges connecting this node with other node. Subsequently, the nodes with maximum degree are determined and, in step S8, the arithmetic means over the nodes with maximum degree is determined as the statistical drawbar length estimate $\hat{l}_{A,stat}$.

Alternatively, the statistical drawbar length estimate $\hat{l}_{A,stat}$ can also be determined from the minimum or maximum over nodes with maximum degree. It would also be possible to consider those nodes that belong to a maximum clique. The term clique in the mathematical graph theory refers to the set of nodes that are pair-wise connected with an edge.

The quality measure Q associated with the statistical drawbar length estimate $\hat{l}_{A,stat}$ is determined in a subsequent step S9. This quality measure Q depends from the graphs constructed thus far and the distance measure. The value Q of the quality measure is between 0 and 1 and is determined as a function of the maximum degree P relevant for the determination of the statistical drawbar length estimate $\hat{l}_{A,stat}$. For example, a Q value of 0.00 may be assigned a degree P<4 and a Q value of 1.00 for example to a degree P>10. The intermediate values for the degree P may be distributed uniformly or nonuniformly.

In a step S10, with these two values, the statistical drawbar length estimate $\hat{l}_{A,stat}$ and the associated quality measure Q, a final estimate $l_{A,final}$ for the drawbar length $l_A$ is determined, which converges via the sequence of estimation time windows with high probability towards a value that approximates the true value of the drawbar length $l_A$ from below. This final estimate $l_{A,final}$ of the drawbar length $l_A$ can be determined, for example, according to following formula:

$$l_A = \hat{l}_A * Q.$$

With a quality measure Q with the value 0, the drawbar length is assumed to have a default value, for example, the shortest possible drawbar length of a permissible trailer, which corresponds to a worst-case value.

From this final estimate $l_{A,final}$ for the drawbar length $l_A$, in a step S11, the maximum allowable articulation angle $\gamma_{max}$ is determined by elementary geometric relationships from the quantities wheelbase l of the tractor, distance $l_d$ of the rear-axle from the ball head of the trailer hitch, drawbar length $l_A$ of the trailer, maximum front and rear steering angle $d_{v,max}$ and $d_{h,max}$ and the radii $R_1$ and $R_2$ (See FIG. 1). A trailer can be pushed in reverse travel in a straight line up to this maximum permissible articulation angle $\gamma_{max}$.

Because the kinematic and the dynamics of the tractor-trailer combination strongly depends on the actual drawbar length, the threshold values for generating the estimation time window are made dependent also from the current estimate the drawbar length and not only from the input variables.

In particular, the criterion causing the estimated value to be discarded may be adapted according to step S5 in relation to the presence of a specific swing of the articulation angle, to match the last estimated value of the drawbar length, for example by increasing the associated threshold when a long drawbar length was estimated in order to prevent an exceedingly large value to be estimated for the drawbar length. If this increased swing value is not detected, the estimation time window and hence also the potentially excessively large estimate the drawbar length are discarded.

Furthermore, when opening a new estimation time window, the starting values of the Kalman filter may be matched entirely or partially to the estimated values obtained when the last estimation time window was closed. In order to obtain an exact estimated value within only a few estimation cycles, specific situations in driving operation, as for example straightening the tractor-trailer combination, may be included when setting the starting values, because the uncertainties are generally less after such situations than under normal driving conditions. In particular, after straightening the tractor-trailer combination, the offset between the measured and the actual articulation angle is known so that this uncertainty is small.

After the maximum permissible articulation angle $\gamma_{max}$ is outputted, for example to a maneuvering assistant, the process branches again back to step S1.

The invention claimed is:

1. A method for determining a drawbar length of a trailer of a tractor vehicle, the tractor vehicle having a front-axle steering system for adjusting a front-axle steering angle, the method comprising:
measuring with sensors an articulation angle between the trailer and the tractor vehicle,
determining an estimated value for the drawbar length by an estimation method based on the measured articulation angle and based on the front-axle steering angle and movement variables represented by a speed and a yaw rate of the tractor vehicle, wherein the estimation method comprises:
generating a sequence of estimation time windows having a beginning and an end, wherein the end of an estimation time window is defined by presence of predetermined conditions relating to dynamic movement variables of the tractor vehicle and the trailer, determining at the end of each estimation time window an estimated value of the drawbar length, successively determining from a current estimated value of the drawbar length, by statistical evaluation, statistical drawbar length estimates, each statistical drawbar length estimate having a respective quality measure, weighting each statistical drawbar length estimate with the respective quality measure, and successively determining final estimated values for the drawbar length from the weighted statistical drawbar length estimates.

2. The method of claim 1, wherein the estimated value of the drawbar length is determined in an estimation time window by using an articulation angle estimate for the articulation angle and an offset estimate for an offset between the articulation angle estimate and the measured articulation angle, wherein the articulation angle estimate and the offset estimate are determined using the estimation method.

3. The method of claim 1, further comprising continuously generating an undirected graph for the statistical evaluation of the estimated values of the drawbar length, and drawing an edge depending on a value of a distance measure between the estimated values of the drawbar length, which form nodes of the graph.

4. The method of claim 3, wherein the statistical drawbar length estimates are determined as a weighted estimated value of the drawbar length from the nodes of a current graph having a maximum degree, and wherein the quality measure is determined as a function of the maximum degree.

5. The method of claim 3, wherein the statistical drawbar length estimate is determined as a minimum of the nodes of a current graph having a maximum degree, and wherein the quality measure is determined as a function of the maximum degree.

6. The method of claim 3, wherein the statistical drawbar length estimate is determined as a maximum of the nodes of the current graph having a maximum degree, and wherein the quality measure is determined as a function of the maximum degree.

7. The method of claim 3, wherein the statistical drawbar length estimate is determined from a set of the nodes that are part of a maximum clique of a current graph having a maximum degree, and wherein the quality measure is determined as a function of the maximum degree.

8. The method of claim 1, wherein an estimation time window is derived from at least one movement quantity selected from the yaw rate and the speed of the tractor vehicle, and a rotation rate of the trailer relative to the tractor vehicle.

9. The method of claim 8, further comprising determining threshold values for the at least one movement quantity, with the estimation time window being opened and closed as a function of the determined threshold values.

10. The method of claim 9, wherein a threshold value determining the estimation time window is determined as a function of the drawbar length estimate or of a final estimated value for the drawbar length.

11. The method of claim 1, wherein an estimated value generated during an estimation time window is discarded when a duration of the estimation time window is less than a predetermined duration threshold value.

12. The method of claim 1, wherein an estimated value generated during a particular estimation time window is discarded when the articulation angle between the trailer and the tractor vehicle swept during the particular estimation time window is smaller than a predetermined swing threshold value.

13. The method of claim 1, wherein an estimated value produced during a particular estimation time window is discarded when the articulation angle of the trailer above ground swept during the particular estimation time window is less than a predetermined trailer swing threshold value.

14. The method of claim 1, wherein the estimated value is determined with a Kalman filter.

15. The method of claim 1, wherein the estimation method uses as a starting value either an estimated value determined based on a last open estimation time window, or a default value.

16. The method of claim 1, wherein the tractor vehicle comprises, in addition to the front-axle steering system, a rear-axle steering system for adjusting a rear-axle steering angle, wherein the estimated value for the drawbar length is determined by the estimation method additionally based on the rear-axle steering angle.

17. The method of claim 1, further comprising determining a maximum permissible articulation angle between the tractor vehicle and the trailer.

* * * * *